United States Patent [19]
Babb

[11] 3,934,218
[45] Jan. 20, 1976

[54] APPARATUS AND METHOD FOR SEISMIC EXPLORATION

[75] Inventor: John J. Babb, Jackson, Miss.

[73] Assignee: Seiscom Delta Inc., Houston, Tex.

[22] Filed: Aug. 17, 1971

[21] Appl. No.: 172,403

[52] U.S. Cl.......................... 340/3 T; 340/7; 340/17; 181/114; 181/122
[51] Int. Cl.² ............................................ G01S 9/66
[58] Field of Search ...... 340/7, 17, 3 T; 181/.5 VM, 181/114, 122

[56] References Cited
UNITED STATES PATENTS

| | | | |
|---|---|---|---|
| 2,649,579 | 8/1953 | Alexander | 340/7 R |
| 2,807,793 | 9/1957 | Bayhi | 340/7 R |
| 3,435,410 | 3/1969 | Babb | 340/7 R |

FOREIGN PATENTS OR APPLICATIONS

| | | | |
|---|---|---|---|
| 826,932 | 1/1960 | United Kingdom | 181/.5 VM |

Primary Examiner—Maynard R. Wilbur
Assistant Examiner—T. M. Blum
Attorney, Agent, or Firm—Pravel & Wilson

[57] ABSTRACT

New and improved apparatus and method for seismic exploration on land transports sensing geophones with a flat, lightweight, towing medium or sheet which conforms to the earth's surface. The geophones are mounted on sleds attached to the towing medium by strips or members of resilient material which isolate and decouple the geophone from vibrations and the like induced, sensed, or transmitted by the towing medium. The resilient members enable the geophones and sleds to continually maintain contact with the earth's surface over irregularities in the surface to provide good ground coupling for more accurate seismic exploration results. Plural or multiple towing mediums may be coupled together and towed into place for use in accordance with the desired geophone array to be used.

3 Claims, 5 Drawing Figures

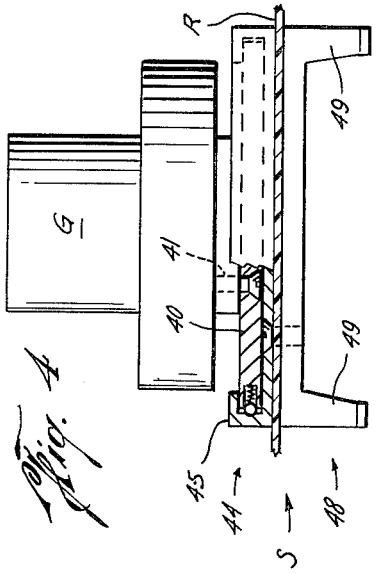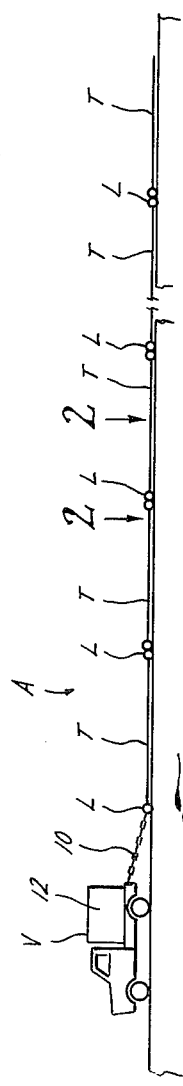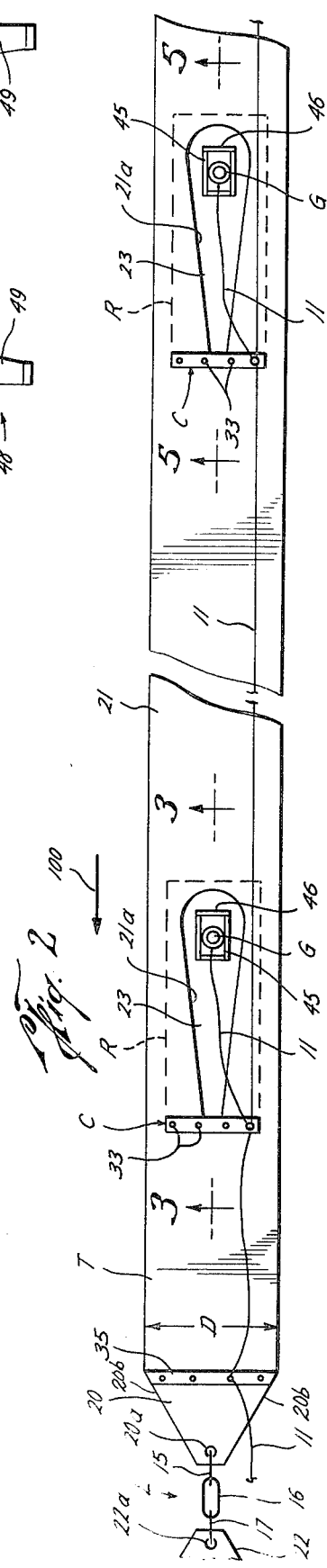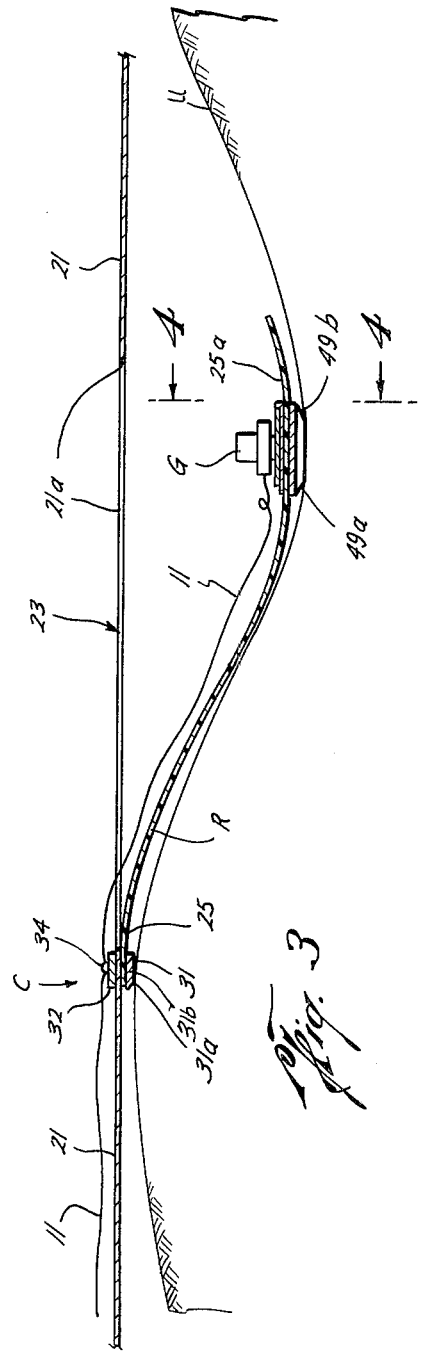

APPARATUS AND METHOD FOR SEISMIC EXPLORATION

BACKGROUND OF THE INVENTION

1. Field of Invention

The present invention relates to methods and apparatus for seismic exploration.

2. Description of Prior Art

In the prior art, geophone arrays for land seismic operations were positioned, or laid out, by individually placing or "planting" each geophone by hand. Typically, the geophones were clustered in groups at a plurality of stations, each geophone at a station being connected to auxiliary wiring known in the art as "strings" or "pigtails." Multi-conductor geophone cables were used to transmit the signals sensed by the geophones during seismic exploration to a recording apparatus. The cables and auxiliary wiring were positioned by men in the field or mechanically reeled from vehicle-mounted equipment such as storage reels. Consequently, placing the geophones and associated wiring and cables in position for seismic exploration and retrieving same when moving to a new location after completion of operations was costly, laborious, and time-consuming.

In marine seismic exploration operations, ballasted streamer cables having pressure type geophones therewith were drawn behind a marine vessel. The water medium permitted smooth pulling and towing operations with the streamer cables and permitted easy and ready acoustic coupling of the seismic energy with the pressure geophones.

Previous attempts in seismic exploration to push, pull, or tow a land geophone cable have been unsatisfactory for several reasons. Such geophone cables have heretofore utilized a long conductor cable having a protective plastic or rubber exterior covering and having velocity geophones mounted by gimbals in covered housings in the cable, or in housings coupled to the cable by coupling wire. The gimbal mountings were required to maintain the geophones upright to provide accurate sensing of seismic signals.

The prior art geophone cables were heavy and cut into the earth's surface or ground during movement and use and were thus difficult to pull, particularly if of substantial length. Also, such cables were expensive and subject to wear. Further, and more importantly, the gimbal mountings prevented effective decoupling and isolation of the geophones from vibrations and the like induced in or sensed by the taut towing cables during seismic exploration, reducing the sensitivity and accuracy of the geophones. When the cables and geophones were used on uneven ground surfaces, difficulties in decoupling and isolation, and problems in achieving a good ground coupling between the geophone and the ground surface were further increased.

SUMMARY OF INVENTION

Briefly, the present invention provides a new and improved method and apparatus for seismic exploration using seismic signals wherein geophones are moved and placed in position for seismic exploration operations by a towing medium. Once the geophones are in position and exploration operations begin, a resilient strip member isolates the geophones from vibrations and the like induced in the towing medium during exploration operations in order to obtain more accurate results during seismic exploration.

The resilient strip member flexibly mounts the geophones to the towing medium and permits the geophones to maintain ground contact and engagement and good ground coupling when exploration is being conducted on rough or uneven ground surfaces. Apertures or cut-outs are formed in the towing medium to permit the geophones and resilient strip to move upwardly and downwardly with respect to the towing medium during movement over the earth's surface, with the resilient strip absorbing vibrations induced in the towing medium during seismic exploration and decoupling and isolating the geophones from such vibrations.

The towing medium in the preferred embodiment is a flexible sheet member, conforming to the earth's surface or ground having substantial width relative to the longitudinal axis of the medium and transverse that of the towing movement, thereby resisting undesirable axial, dimensional or oscillatory rotation, rolling, or tipping during movement. The resilient strip is mounted with the towing sheet member by a clamp bar having a beveled leading edge which partially smooths a path for the geophones during movement of the towing sheet. The geophones are mounted on geophone sleds which mount the geophones with the resilient strip and further engage the ground surface for coupling the geophones therewith.

It is an object of the present invention to provide a new and improved method and apparatus for seismic exploration.

BRIEF DESCRIPTION OF THE DRAWINGS

FIG. 1 is an elevation view of the apparatus of the present invention;

FIG. 2 is a plan view taken along the line 2—2 of FIG. 1;

FIG. 3 is a cross-sectional view taken along the lines 3—3 of FIG. 2;

FIG. 4 is a cross-sectional view taken along the lines 4—4 of FIG. 3; and

DESCRIPTION OF THE PREFERRED EMBODIMENT

Figure 5:
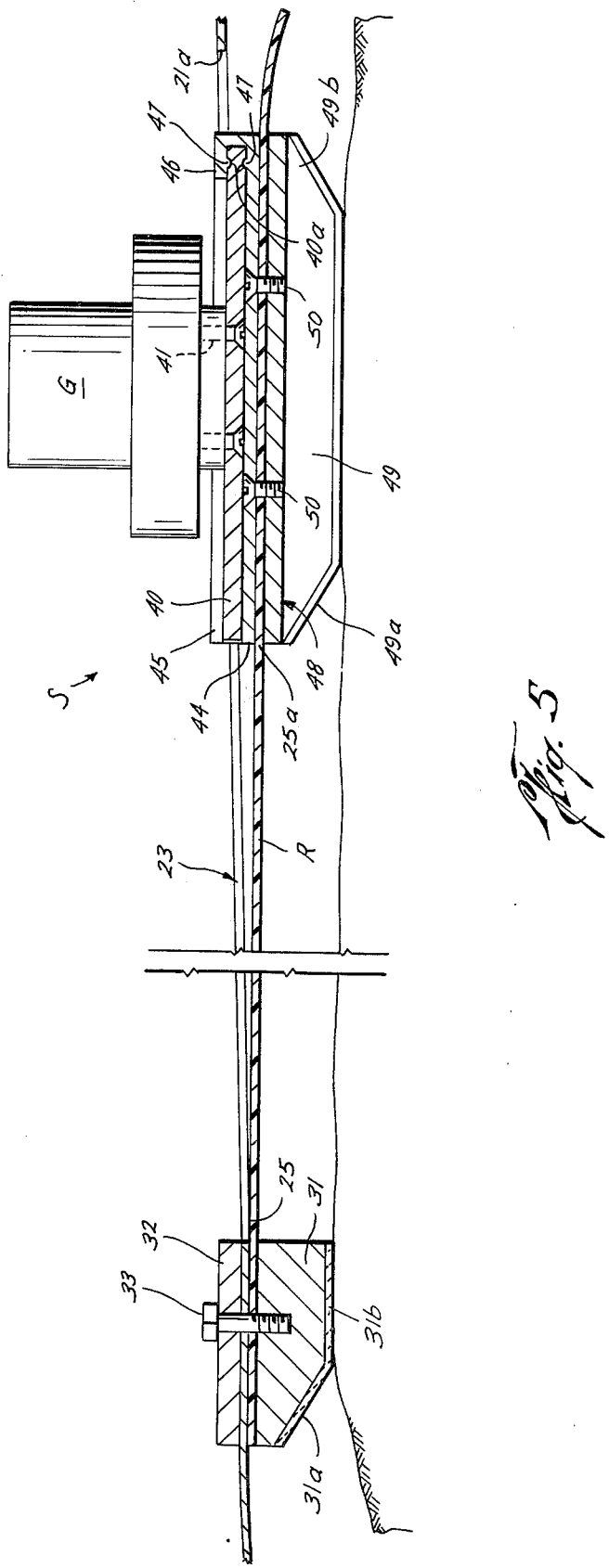
FIG. 5 is a cross-sectional view taken along the lines 5—5 of FIG. 2.

In the drawings, the letter A designates generally the apparatus of the present invention used for seismic exploration on the earth's surface. The apparatus A comprises a purality of towing sheet members T for moving and placement of a plurality of geophones G in a desired geophone array for sensing seismic signals sent into the earth's surface during the seismic exploration operations. The geophones G may be any of the numerous conventional commercially available seismic sensing geophones of the well-known type. A truck or other vehicle V is connected by a chain 10 or other suitable connecting structure to drag and tow the towing sheet members T and the geophones G into position for the seismic exploration operations, as will be more evident hereinbelow.

Each of the towing sheet members T with the exception of the foremost towing sheet member T, nearest the vehicle V, and the rearmost towing sheet member T is connected at a leading and trailing edge with an adjacent towing sheet member T by a link coupling L (FIGS. 1 and 2). In this manner, the towing sheet members T may be mounted with each other in a streamer arrangement or array in accordance with the desired geophone array to be used during the seismic exploration operations. Each of the geophones G is electrically connected through an electrical conductor 11 (FIG. 2) to monitoring, sensing, and recording instrumentation of the conventional and well-known type which is contained in a van or cabin 12 on the vehicle V (FIG. 1).

Considering the towing sheet members T more in detail (FIG. 2), each of the towing sheet members T includes a nose portion 20 having a tapered outer surface 20b and having an aperture or opening 20a formed therein to receive a link or chain 15 of the link coupling L. A central or center coupling 16 of the link coupling L is connected with a rear link or coupling 17 of the link coupling L which is connected to a rear or tail portion 22 of the preceding or leading towing sheet member T at an aperture 22a formed therein. The central towing members 16 permit turning and oscillatory or wave movement between leading and trailing towing sheet members T when it is desired to tow the array of towing sheet members T about a corner during movement of the apparatus A, or when the sheet members T are towed over irregular surfaces, as will be set forth hereinbelow.

A center or middle portion 21 extends between the nose portion 20 and the rear portion 22 of each of the towing sheet members T (FIG. 2). The towing sheet members T are made of sheets of thin steel or other suitably strong material, making the towing sheets T flexible for placement of the geophones G into position on the earth's surface and conforming substantially to the earth's surface during placement and movements of the geophones G over the earth's surface. Further, the towing sheet members T have a wide surface of engagement with the earth's surface in a direction D (FIG. 2) relative to the longitudinal axis of the sheet T and transverse the direction of movement as illustrated by the arrow 100 of the towing sheet members T during towing operations (FIG. 2).

The relatively wide surface of engagement of the towing sheet members T with the ground surface G reduces and resists undesirable axial and dimensional, rotational, oscillatory, rolling, or tipping movement of the towing sheet members T during movement of the apparatus A over surfaces, particularly when such surfaces are irregular, sloped, rough, or uneven. Further, the thin sheet or strip of the towing sheet member T has a low load bearing per unit surface area on the surface, reducing the amount of force required to tow the apparatus A over the surface and further reducing the wear and friction between the towing sheet members and the surface. The towing sheet members T are lightweight and made in units of any convenient length, for example in one embodiment 200 to 220 feet and are easily handled and moved by one or two crewmen when made in such lengths.

Further, with the relatively thin towing sheet members, the geophones G and the electric conductor 11 may be removed therefrom and the towing sheet members can be reeled or spooled onto a power reel or spool system and stored thereon when the apparatus A is not in use. If desired, the power reel or spool system could be mounted with the rear of a suitable vehicle for transportation of the apparatus A to a new seismic exploration area or for storage.

Each of the towing sheet members T includes a plurality of teardrop or droplet shaped apertures or cutouts 23 defined by shaped edge surface 21a (FIG. 2). The apertures 23 formed in the towing sheet members permit relative movement of the geophones G with respect to the towing sheet members T during movement of the apparatus A over the ground surface when moving the apparatus A into position for a seismic exploration operation.

Each of the geophones G is mounted with and attached with the towing sheet member T in the cutouts 23 by a resilient strip R of nylon or other suitable lightweight resilient material. The geophones G are mounted with the resilient strip R, in a manner to be more evident hereinbelow, at a rear or trailing portion 25a (FIG. 3), of the strip R. It should be noted that the geophones G are mounted with the resilient strips R at positions isolated from and out of contact with the towing sheet members T and are positioned in the openings 23 for riding adjacent the upper surface of the member T when the sheet T is pulled on relatively smooth and even surfaces (FIG. 5).

The resilient strip R attaches the geophone G with the towing sheet member T and permits relative movement between the towing sheet member T and the geophone G during movement of the apparatus A over the surface into position for exploration operations. The resilient strip R absorbs vibrations and the like induced in the towing sheet member T during seismic exploration after the geophones G are in place in order to increase the accuracy of the geophones G and sensitivity of such geophones to seismic signals in the surface during seismic exploration operations, as will be more evident hereinbelow.

The resilient strips R are mounted at a leading portion or edge 25 thereof with the towing sheet members T by a clamp C adjacent the leading or forward portion of the aperture 23 formed in the towing sheet member T. The clamps C comprise a lower clamp bar 31 (FIG. 3) and an upper clamp bar 32, mounted with each other by bolts 33, screws, or other suitable fastening means which pass through openings (not numbered) formed in the towing sheet member T and the leading portion 25 of the resilient strips R into suitable sockets formed in the upper surface of the clamp bar 31. The clamp bar 31 is mounted with the resilient strip R and the towing member T transverse the longitudinal axis of the member T and transverse the direction of movement 100 of the apparatus A and for smoothing a path across the surface.

The clamp bar 31 includes a beveled leading edge 31a and a riding lower surface 31b positioned below the member T. The beveled edge 31a scrapes, smooths, cleans, and otherwise helps to reduce catching and snagging of the clamp bar 31 during movement thereof across uneven ground surfaces and provides a more even surface, where possible, for the geophones to ride on.

Spring steel clamps or harnesses 34 are mounted with the upper clamp bar 32 and hold the cable 11 in place on top of the steel towing member T during movement thereof and during seismic exploration operations.

A harness 35 is mounted with the towing sheet member T at the junction of the nose portion 20 and the center portion 21 and at a similar junction (not shown) of the center portion 21 and the tail portion 22 and has spring clips mounted therewith to harness the electrical conductor or cable 11 across the link-coupling L between adjacent leading and trailing towing sheet members T.

Each of the geophones G is mounted with a geophone sled S (FIGS. 3–5) which engages the earth's surface during movement of the geophones G thereacross and couples the geophones G with the surface during seismic explorations. The geophone G is mounted with a geophone plate 40 by screws 41 or other suitable means. The geophone plate 40 is mounted within an upper receiving portion 44 of the geophone sled S (FIG. 4). The upper receiving portion 44 of the geophone sled S has U-shaped channels formed therein along side members 45 and U-shaped channels formed along a rear member 46 (FIG. 5) thereof to receive and retain the edges of the geophone plate 40 when inserted therein. The portion or plate 44 holds the geophone G in place with respect to the sled S and the resilient strip R during movement and during seismic exploration operations.

Locking notches 40a are formed in the plate 40 adjacent the rear member 46 for locking and holding the geophone G relative to the sled S during movement and also during seismic exploration operations.

A lower portion 48 of the geophone sled S includes a plurality of runners 49 extending downwardly therefrom engaging the surface and insuring good coupling between the geophone G and the surface during seismic exploration operations. The runners 49 have bevelled leading edges 49a and trailing edges 49b formed thereon to reduce snagging, catching and the like of the geophone sled S during movement across uneven or rough ground surfaces. Further, the runners 49 have hardened wear surfaces formed thereon along the ground engaging surfaces thereof and along the leading edges 49a and trailing edges 49b to resist wear and insure long service life of the geophone sleds S.

The upper portion 44 of the geophone sled S and the lower portion 48 thereof are mounted with each other by screws 50 or other suitable means (FIG. 4) which pass through the upper portion 44, the trailing portion 25a of resilient strip R, and the lower portion 48 of the sled S in order to mount same with respect to each other.

The resilient strip R mounted between the plates 44 and 48 flexibly mounts the geophones G with the towing members T and permits relative movement of the geophones G in the cutouts 23 with respect to the towing sheet T during movement of the apparatus A along irregular surfaces and across such surfaces. When the apparatus A is in position for the seismic exploration operations, the resilient strip R absorbs vibrations, undesired movement, oscillation, wave action and other undesired action, and the like induced in the towing sheet members T during seismic exploration to thereby isolate the geophones G and decouple same from such unwanted action during seismic exploration in order to increase the sensitivity and accuracy of results from the geophones G.

When the apparatus A is moving over realtively uneven and irregular surfaces, such as illustrated at U (FIG. 3), the resilient strip R permits the geophone G and the sled S to remain in contact with the surface by permitting downward movement of the geophones G and the sled S through the cutout 23. The runners 49 thus ride over the surface U to remain in contact therewith and the resilient strip R absorbs vibrations and the like induced in towing sheet member T while at the same time dragging the strip R. Also during normal seismic exploration operations, the towing member T is pulled into position and towing movement ceased so that the strip R absorbs induced vibration or other unwanted noises or movement when the seismic "shot" is set off or due to other sources. Thus, since shock and vibration induced in the center portion 21 of the towing sheet members are absorbed by the resilient strip R, the geophones G are decoupled and isolated from the vibrations of the towing sheet member or other causes.

On unusually uneven surfaces, in the event that one of the geophones G is positioned over a relatively deep hole, crevice, or pit, such geophone will hang downwardly with the resilient strip R substantially vertically from the towing sheet member T out of contact with the ground surface adjacent the hole. The resilient strip R isolates and decouples the geophone G, as previously set forth hereinabove, from vibrations and prevents the vertically suspended geophone G from sensing spurious and inaccurate seismic signals.

When the geophones G and the apparatus A are being used on relatively smooth ground surfaces, whether flat, or sloping downwardly or upwardly, (FIG. 5), the geophones G pass upwardly through the cutout 23 of the towing sheet member T during movement and placement of the geophones G on the ground surface. The resilient strip R, due to the location of the sleds S and geophones G with respect to the edges 21a of the towing sheet member T adjacent the aperture 23, as set forth hereinabove, prevents contact between the geophones G and towing sheet member T, permitting the resilient strip R to absorb vibrations induced in the towing sheet member T during seismic exploration, thereby decoupling and isolating the vibrations in the towing sheet member T from the geophones G.

In the operation of the present invention, the geophones G are mounted with the geophone plates 40 and snap-fitted or mounted at notches 40a with the detent 47 in the upper portion of the geophone sled S. The upper portion 44 and the lower portion 48 of the geophone sled S are then mounted with each other, with the rear portion 25a of the resilient strip R therebetween. The leading edge 25 of the resilient strip R is then mounted with the towing sheet member T by the clamps C and bolts 33. In this manner, a suitable number of geophones for the desired number of towing sheet members T to be used in the exploration operation are mounted with the towing sheet members T.

A suitable number of towing sheet members T to achieve the desired geophone array for the particular seismic exploration operation to be conducted are then formed by connecting and coupling the towing sheet members T with link couplings L to obtain the desired geophone array. The electrical conductors 11 are then connected to each of the geophones G and harnessed to the spring clips 34 on the clamps C and the spring clips on the harness 35 to mount the electrical conductors 11 with the apparatus A.

The apparatus A is then towed behind the vehicle V until the geophones G are positioned in the desired array on the earth surface. At this time, the vehicle V is stopped, placing the geophones G in position for seismic exploration operations. With the apparatus A, the geophones G may be easily towed and placed into position for seismic exploration operations. With the geophones G mounted with the sled S, the geophones are slidingly moved into position for sensing seismic signals. The sliding movement of the geophones G into position is desirable in order to insure good ground coupling for accurate exploration results. Further, the geophones G maintain good ground coupling with the surface due to the flexible mounting between the geophones G and the towing sheet member T afforded by the resilient strip R. Further, the apparatus A may be positioned partially upon relatively smooth ground surfaces and in part upon uneven surfaces due to the flexible towing sheet member T and the resilient strips R, permitting the geophones G to maintain good ground coupling for accuracy and sensitivity of the geophones G in sensing the seismic exploration signals.

When seismic exploration operations are completed at the original location, and it is necessary to move the apparatus A to a new location for a related seismic exploration, the vehicle V then tows the apparatus A into position for subsequent operations. If it becomes necessary to move the apparatus A around a corner, or to position the geophones in a dog-leg or angular or other array not in form of a straight line, a cornering anchor may be used. The leading portion of the array is towed past the cornering anchor at the desired angle with respect to the remaining portion of the streamer or array. When the array is in the desired dog-leg configuration or other array, the vehicle is stopped and seismic exploration operations begin.

A suitable cornering anchor, for example, is a roller mounted at the corner to be turned in order to engage the sides of the towing members T as they are towed past the roller at the corner. The roller could be mounted with a post, stake, or with a truck or tractor at the front or rear. As the side edges of towing sheet members T are towed therepast, the roller engages the side edges. As the link couplings between a leading and trailing sheet member passes the roller, the leading towing sheet member pivots into the new line of movement of the vehicle V with respect to the corner, with the trailing member moving in the earlier direction of movement of the vehicle V. The cornering operation is then repeated until the desired array of geophones G for the exploration operation is achieved.

It should be understood that the term earth surface or surface used in the description of this invention includes and refers to any earthen surface, such as the earthen floor or surface beneath an ocean, sea, lake, river or other body of water. In such instances, the towing vehicle V would be a suitable marine vessel, barge or boat.

It should further be understood that with a suitably strong resilient means or flexible towing strip material, the towing sheet member and resilient strip might be combined into one resilient means or member and perform both the towing and isolating functions of such structure.

The foregoing disclosure and description of the invention are illustrative and explanatory thereof, and various changes in the size, shape, and materials, as well as in the details of the illustrated construction may be made without departing from the spirit of the invention.

I claim:

1. An apparatus for seismic exploration operations using seismic signals comprising:
    a. geophone means for sensing the seismic signals during the exploration operations;
    b. towing means for moving and placement of said geophone means in position for the exploration operations, said towing means comprising a towing sheet member having an aperture formed therein for permitting movement of said geophone means through said towing sheet member during movement and placement of said geophone means on surfaces; and
    c. resilient means for isolating said geophone means from vibrations and the like in said towing means wherein more accurate exploration results are obtained, said resilient means comprising resilient strip means for mounting said geophone means with said towing sheet member preventing contact between said geophone means and said towing member to permit said resilient strip means to absorb the vibrations and the like induced in said towing sheet member during seismic exploration, wherein said geophone means is acoustically decoupled and isolated from the vibrations in said towing sheet member.

2. An apparatus for seismic exploration operations using seismic signals comprising:
    a. geophone means for sensing the seismic signals during the exploration operations;
    b. towing means for moving and placement of said geophone means in position for the exploration operations, said towing means comprising a towing sheet member having an aperture formed therein for permitting movement of said geophone means with respect to said towing sheet member during movement and placement of said geophone means over uneven surfaces;
    c. a resilient means for isolating said geophone means from vibrations and the like in said towing means, said resilient means including resilient strip means mounting said geophone means with said towing sheet member and permitting downward movement of said geophone means, thereby allowing said geophone means to remain in contact with the uneven surface and wherein said resilient strip means absorb the vibrations and the like induced in said towing sheet member during seismic exploration, wherein said geophone means is acoustically decoupled and isolated from the vibrations in said towing sheet member.

3. An apparatus for seismic exploration operations using seismic signals comprising:
    a. geophone means for sensing the seismic signal during the exploration operation;
    b. towing means for moving and placement of said geophone means in position for the exploration operations;
    c. resilient means for isolating said geophone means from vibrations and the like in said towing means;
    d. geophone sled means for engaging the surface during movement of said geophone means and coupling said geophone means with the surface during seismic explorations;
    e. detent means for mounting said geophone means with said geophone sled means;
    f. said geophone sled means comprising a plurality of runners engaging the ground surface and coupling said geophone means with the ground surface during seismic exploration, said runners having beveled leading and turning edges to reduce catching and snagging of said geophone sled means during movement across uneven ground surface;
    g. said towing means including a towing sheet member having an aperture formed therein for permitting movement of said geophone means with respect to said towing sheet member and said sled means; and h. said resilient means comprising a resilient strip means mounting said geophone means and said sled means with said towing sheet member and permitting downward movement of said geophone means and said sled means, thereby allowing said geophone means and said sled means to remain in contact with the uneven surface.

* * * * *